United States Patent
Haubold et al.

(10) Patent No.: US 11,144,443 B2
(45) Date of Patent: Oct. 12, 2021

(54) OPTIMIZATION OF WORKLOADS BASED ON CONSTRAINTS

(71) Applicant: MICROSOFT TECHNOLOGY LICENSING, LLC, Redmond, WA (US)

(72) Inventors: Jeremy Haubold, Portage, IN (US); Derek Kiwamu Tsuchida, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/565,397

(22) Filed: Sep. 9, 2019

(65) Prior Publication Data
US 2021/0073114 A1 Mar. 11, 2021

(51) Int. Cl.
*G06F 11/36* (2006.01)
*G06F 9/50* (2006.01)

(52) U.S. Cl.
CPC .......... *G06F 11/3692* (2013.01); *G06F 9/505* (2013.01); *G06F 9/5011* (2013.01); *G06F 11/3612* (2013.01); *G06F 11/3688* (2013.01)

(58) Field of Classification Search
CPC ............. G06F 11/3612; G06F 11/3692; G06F 11/3688; G06F 9/505; G06F 9/5011
See application file for complete search history.

(56) References Cited

U.S. PATENT DOCUMENTS

| | | | |
|---|---|---|---|
| 5,933,834 A * | 8/1999 | Aichelen | G06F 3/0613 348/E5.008 |
| 7,970,905 B2 | 6/2011 | Baskaran et al. | |
| 8,140,775 B1 * | 3/2012 | Chatterjee | G06F 11/3452 711/154 |
| 8,250,581 B1 | 8/2012 | Blanding | |
| 8,499,066 B1 * | 7/2013 | Zhang | H04L 47/823 709/223 |
| 8,707,300 B2 | 4/2014 | Govindan et al. | |
| 8,909,785 B2 | 12/2014 | Franco et al. | |
| 9,251,050 B2 | 2/2016 | Baldwin et al. | |
| 9,569,277 B1 | 2/2017 | Cropper et al. | |

(Continued)

OTHER PUBLICATIONS

Xudong Niu et al., "Workload Allocation Mechanism for Minimum Service Delay in Edge Computing-Based Power Internet of Things," 2019 [retrieved Feb. 11, 2021], IEEE, pp. 83771-83784, downloaded from <url>:https://ieeexplore.ieee.org/. (Year: 2019).*

(Continued)

*Primary Examiner* — S. Sough
*Assistant Examiner* — Stephen D Berman
(74) *Attorney, Agent, or Firm* — Newport IP, LLC; Han K. Gim

(57) ABSTRACT

Techniques are disclosed for allocating computing resources. Historical verification test data for one or more workloads is accessed. The accessed data is updated by removing data for workloads that are mathematical outliers. Based on the updated data, for one or more workload groups, resource allocations for a range of test times are determined. Based on the allocations, costs for the one or more workload groups are predicted. One or more test configurations are updated based on the predicting.

12 Claims, 6 Drawing Sheets

(56) References Cited

U.S. PATENT DOCUMENTS

| | | | |
|---|---|---|---|
| 9,588,816 B2 | 3/2017 | Zhu et al. | |
| 10,430,319 B1* | 10/2019 | Tokappa | G06F 11/368 |
| 2008/0172673 A1 | 7/2008 | Naik | |
| 2008/0222646 A1 | 9/2008 | Sigal et al. | |
| 2011/0066486 A1* | 3/2011 | Bassin | G06Q 10/103 |
| | | | 705/14.43 |
| 2013/0086235 A1 | 4/2013 | Ferris | |
| 2013/0182700 A1* | 7/2013 | Figura | H04L 43/04 |
| | | | 370/352 |
| 2015/0229582 A1* | 8/2015 | Zhu | H04L 47/762 |
| | | | 709/224 |
| 2016/0092274 A1 | 3/2016 | Singh et al. | |
| 2017/0139817 A1* | 5/2017 | Bassin | G06F 8/70 |
| 2018/0004631 A1 | 1/2018 | Brown et al. | |
| 2018/0205666 A1 | 7/2018 | Nash | |
| 2018/0239685 A1* | 8/2018 | Byrne | G06F 9/5072 |
| 2020/0034701 A1* | 1/2020 | Ritter | G06F 9/50 |

OTHER PUBLICATIONS

"Alerts and Notifications—Predefined Alerts", Retrieved From: https://documentation.commvault.com/commvault/v11/article?p=5199.htm, Jul. 24, 2019, 8 Pages.

"Non Provisional Application as Filed in U.S. Appl. No. 16/411,128", filed May 13, 2019, 44 Pages.

Ali, et al., "Workload Balancing", in Journal of Advance in Computers, vol. 91, Jan. 1, 2013, 11 Pages.

Cai, et al., "Peloton: Uber's Unified Resource Scheduler for Diverse Cluster Workloads", Retrieved From: https://eng.uber.com/peloton/, Oct. 30, 2018, 14 Pages.

"International Search Report and Written Opinion Issued in PCT Application No. PCT/US20/038278", dated Sep. 24, 2020, 12 Pages.

* cited by examiner

OPTIMIZATION OF WORKLOADS BASED ON CONSTRAINTS

BACKGROUND

Computer systems, and in particular distributed and networked computer systems, are widely used for many applications. In many instances, computer applications perform computationally intensive tasks to derive usable results for real-world, practical applications. This may include situations that require analysis of extensive amounts of data, or situations where the computer application performs computations on an extensive number of variables, taking into consideration multiple rules and constraints, to derive usable results for various applications. Placement of workloads on compute nodes in a network is one such example of an application whereby rules and constraints are to be considered to determine placements of the workloads that satisfy various goals. Loads must be balanced to handle individual pieces of work across several computing resources. It is with respect to these considerations and others that the disclosure made herein is presented.

SUMMARY

Some systems perform load balancing of individual pieces of work across several resources when all pieces of work have the same requirements. However, in some cases multiple workloads with distinct requirements must be load balanced. The disclosed embodiments describe technologies for determining how to rebalance workloads to minimize both runtime and machine costs. In one example scenario, multiple sets of workloads (tests, jobs, etc.) may be grouped by requirements (for example, but not limited to OS, RAM, CPU requirements), where it is desirable to minimize both the maximum length of all workloads while also minimizing resource cost. Various embodiments are disclosed for predicting an optimal way to allocate workloads across resources based on known runtimes.

In one embodiment, recent runtimes of known workloads may be determined. This may be performed on a periodic basis such as once per hour. Groups of runtimes may be analyzed based on the number of machines for each group, how long each test runs in each group, and the initial fixed setup time. Based on the analyzed data, groups of machines may be mapped to desired runtimes. The fixed cost setup time may be subtracted from the average total runtime to determine the average testing time. The average testing time may be divided by the desired number of machines and rounded up to determine a number of machines. The expected number of machines to achieve various runtimes for each group may be output. In an embodiment, the expected cost to achieve each runtime may also be output.

By providing such a mechanism for predicting an optimal way to allocate workloads across resources based on known runtimes, computing resources such as virtual machines may be more efficiently utilized, providing for greater operational efficiency.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Many tasks require a significant amount of compute resources. For example, testing a code change is a process that may require hundreds of machines with multiple setups or configurations (e.g., combinations of OS and architecture). It is often desirable to minimize the overall runtime of the tests (e.g., from the time that validation starts to the stopping of the test), balanced against the associated cost. Test operators may desire to determine an optimum number of machines to place in each group, based on a target runtime and cost constraints.

The following Detailed Description describes technologies for predicting an optimal way to allocate workloads across resources based on known runtimes. In one embodiment, recent runtimes of known workloads may be determined. This may be performed on a periodic basis such as once per hour. Groups of runtimes may be analyzed to the number of machines for each group, how long each test runs in each group, and the initial fixed setup time. Based on the analyzed data, groups of machines may be mapped to a desired runtime. The fixed cost setup time may be subtracted from the average total runtime to determine the average testing time. The average testing time may be divided by the desired number of machines and rounded up to determine a number of machines. The expected umber of machines to achieve various runtimes for each group may be output. In an embodiment, the expected cost to achieve each runtime may also be output.

In one example, for a given test an output may include a total cost estimate for the test. The output may further include delta cost and delta resources to achieve different target test durations. For each target duration, the number of machine hours and the delta number of machines needed to achieve the target duration may be provided.

Figure 1:
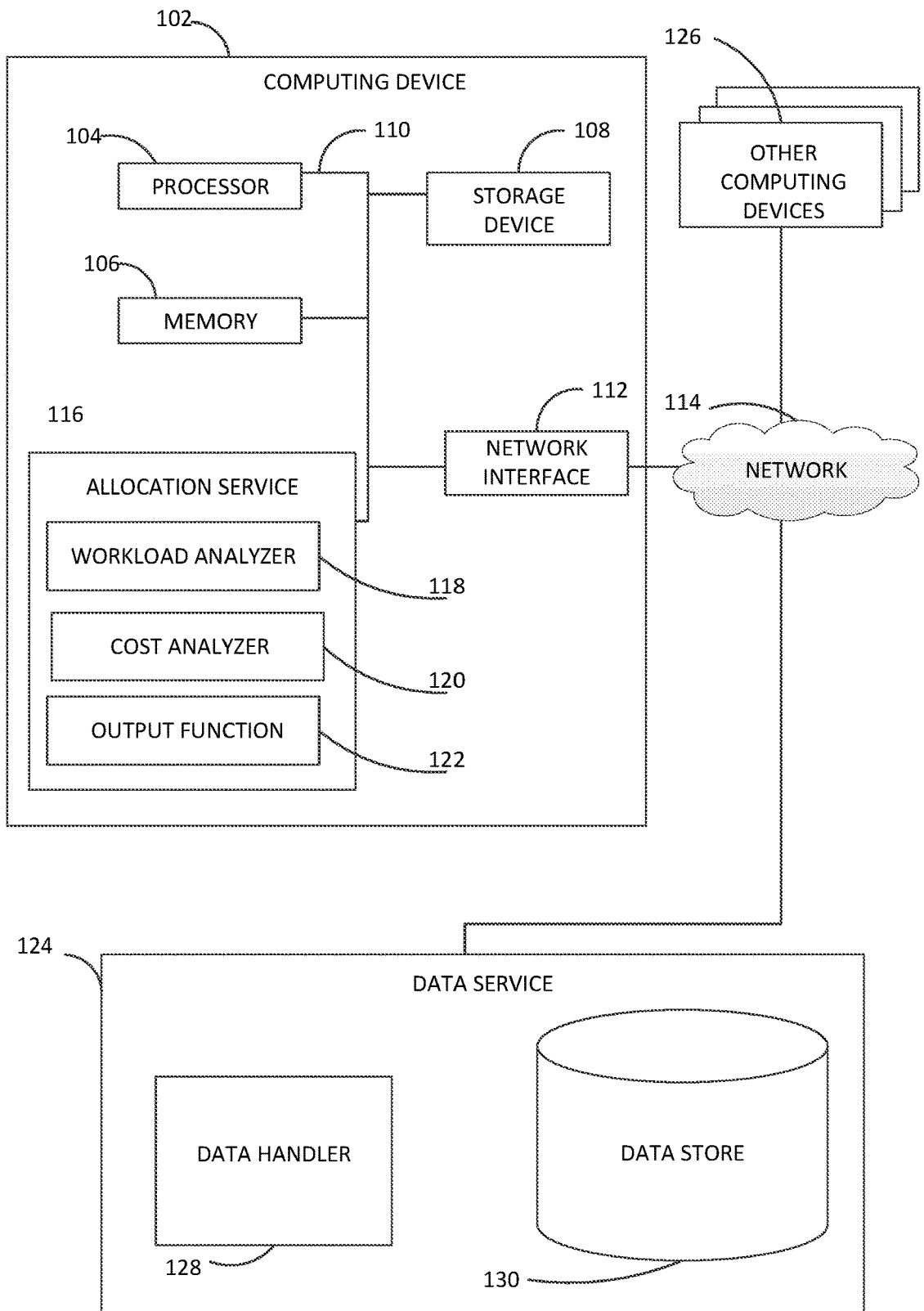
FIG. 1 is a diagram illustrating a computing system in accordance with the present disclosure.

FIG. 1 is a block diagram of an example of a computing system configured to predict and allocate workloads across resources based on known runtimes. The computing system may include a computing device 102. The computing device 102 may be, for example, a laptop computer, desktop computer, or tablet computer, among others. The computing device 102 may include a processor 104 that is adapted to execute stored instructions, as well as a memory unit 106 that stores instructions that are executable by the processor 102. The memory unit 106 may be non-persistent memory in relation to a storage device 108 that may include a hard disk drive for example. The processor 104 can be a single core processor, a multi-core processor, a computing cluster, or any number of other configurations. The memory unit 106 can include random access memory (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.)), flash memory, or any other suitable memory systems. The instructions that are executed by the processor 104 may be used to collect device driver data.

The processor 104 may be connected through a system bus 110 (e.g., PCI, ISA, PCI-Express, NuBus, etc.) to network interface 112 may also be adapted to connect the computing system 100 through the system bus 106 to a network 114.

The storage 108 can include a hard drive, an optical drive, a USB flash drive, an array of drives, or any combinations thereof. An allocation service 116 may be, in some cases, executable instructions to be stored in the storage device 108. In some cases, the allocation service 116 may be implemented as logic, at least partially comprising hardware logic. The allocation service 116 may include submodules including workload analyzer 118, cost analyzer 120, and an output function 122. Although FIG. 1 illustrates each of the modules 118, 120, and 122 as being submodules of the allocation service 116, each of the modules 116, 118, 120, and 122 may be implemented as discrete components, or as components of a broader process, or logical hardware construct.

The allocation service 116 may be configured to predict an optimal way to allocate workloads across resources based on known runtimes. In some cases, the allocation service 116 may be configured to provide communication over the network 114 to a data service 124 which may correspond to a test configuration data collection service.

The allocation service 116 may be configured to generate one or more data objects stored in a memory unit, such as the memory unit 106, of the computing device 102 based on the collected data.

The data object stored in the memory unit 106 may include a delimited list. The data object may include multiple delimited sections embedded into a single file. The multiple sections of driver data may be extracted out as separate delimited files. The multiple delimited lists may each related to different classes or types of devices.

In some embodiments, allocation service 116 may be deployed upon operation of one or more operations provided via the data service 124.

The computing device 102 may communicate with other networked devices, such as one or more networked computing devices 126. The networked computing devices 126 may be implemented similar to the computing device 102 and may also include the allocation service 116 local to each device. Previous workload data may be provided to the data service 124 for storage by a data handler 128. The data handler 128 may be implemented as logic, at least partially including hardware logic, software, firmware, or any combination thereof. The data handler 128 may be configured to decrypt and decompress the recorded workload data. Data may be stored in a data store, such as the data store 120 of the data service 124.

It is to be understood that the block diagram of FIG. 1 is not intended to indicate that a computing system is to include all of the components shown in FIG. 1. Rather, the computing system can include fewer or additional components not illustrated in FIG. 1 (e.g., additional applications, additional modules, additional memory devices, additional network interfaces, etc.). Furthermore, any of the functionalities of the workload analyzer 118, cost analyzer 120, and output function 122 may be partially, or entirely, implemented in hardware and/or in the processor 104. For example, the functionality may be implemented with an application specific integrated circuit, in logic implemented in the processor 104, or in any other device.

Figure 2:
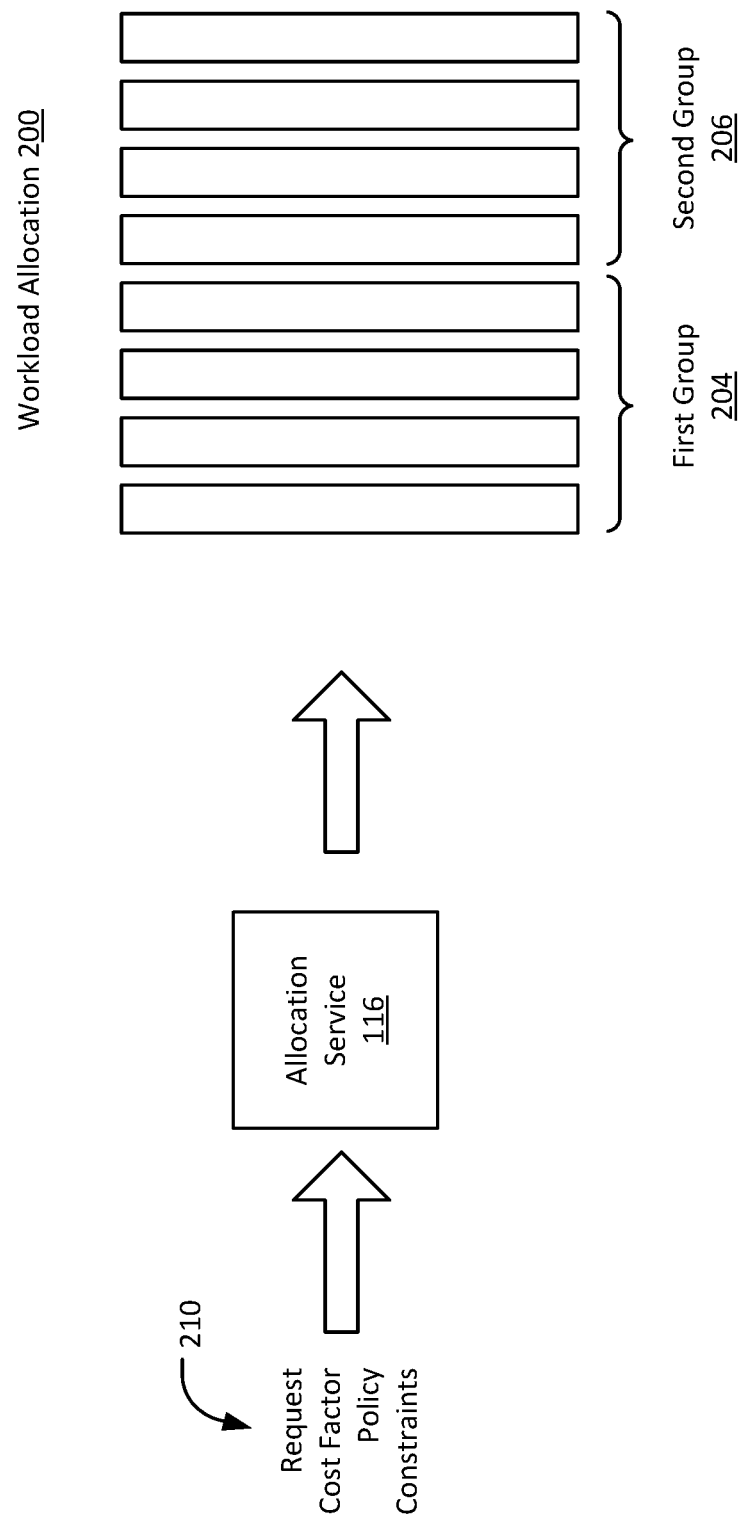
FIG. 2 is a diagram illustrating allocation of resources in accordance with the present disclosure.

In one embodiment, the allocation service 116 may be configured to predict and allocate workloads across resources based on known runtimes. FIG. 2 is a block diagram of an example of allocation service 116 configured to predict and allocate workloads across resources based on known runtimes. Allocation service 116 may receive inputs 210 that may include, for example, a request for allocation of workloads. Inputs 210 may further include cost factors that may describe or limit the cost for running the workloads, one or more policies, and constraints and other rules that may limit or otherwise inform the workload allocation. Allocation service 116 may analyze the inputs 210 to output a workload allocation 200 that may include allocations to a first group 204 and second group 206. Additional groups may be included in other examples.

Figure 3:
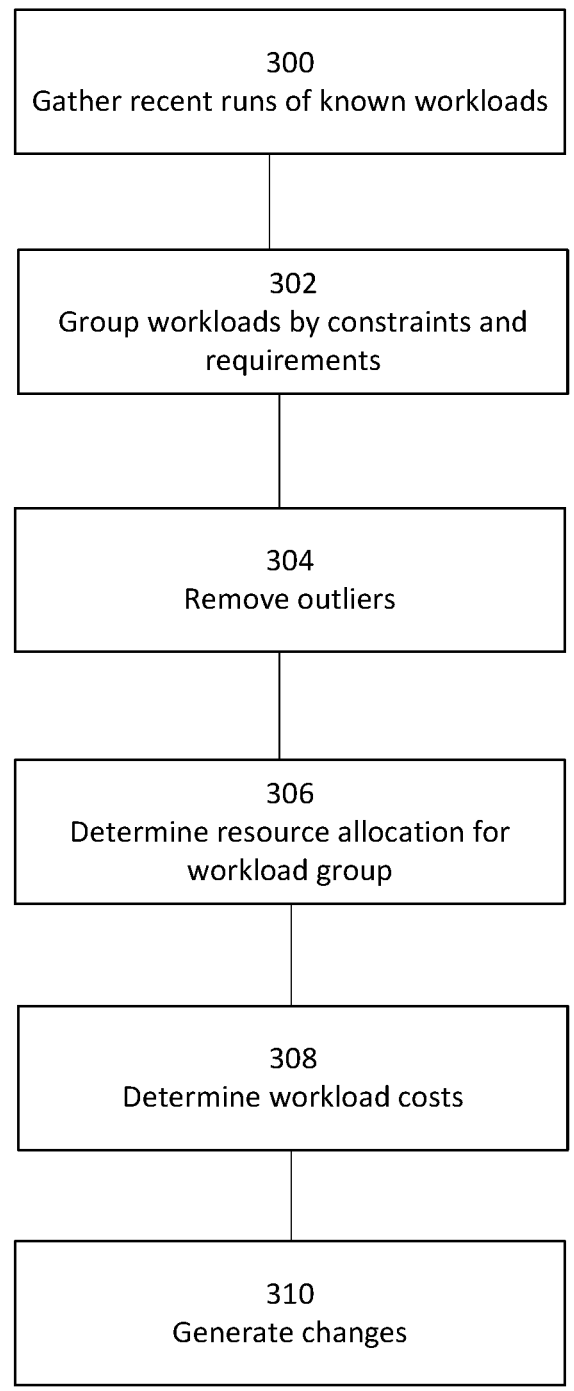
FIG. 3 is a flowchart depicting an example procedure for allocating resources in accordance with the present disclosure.

FIG. 3 illustrates an example of a process for predicting and allocating workloads across resources based on known runtimes. At block 300, recent runs of the known workloads may be accessed and gathered. The data may be analyzed, for example, to determine the time when a machine started operating, start time of the earliest test result, and the end time of last test result to determine the total time. The start time to the earliest test start may be used to determine the setup time.

At block 302, work from all workloads may be grouped by constraints and requirements.

At block 304, mathematical outliers may be removed from each workload group, for example to reduce noise. In one embodiment, the workloads can be ordered by duration, and the top and bottom quartiles may be removed.

Block 306 depicts for every given timestep from minimum to maximum (provided as parameters), determining how many resources should be allocated to each workload group. The allocation service 116 may determine changes that negatively impact either cost or runtime, without improving the other, are not made.

At block 308, based on historical data, a prediction can be made as to how much each workload group will cost with both the current and optimized resource allocation. This may take into account resource preparation cost as well as actual work duration.

In some embodiments, a summary report of the predicted time delta and cost delta may be generated.

At block 310, changes to implement the suggestions as outlined in the report may be automatically generated. In an embodiment, the output may be implemented as one or more configuration files. For example, a configuration file might, for example, be an XML file that provides data that may guide processes and methods for testing workloads. The XML file might define parameters for setting up and executing tests.

In some instances, a portion of the outlined steps may include user input. The system may comprise user interfaces, report generation tools, and the like to facilitate user inputs.

In some embodiments, alerts may be generated if the predicted resource consumption or runtime exceed specified limits. In one embodiment, bin packing algorithms may be used to organize tests within a group.

In some embodiments, costs associate with each prediction may be provided. The cost may be based on historical data and extrapolated. A test configuration may be selected for a given test and the workloads may be restriped for each group to meet a selected target runtime.

Figure 4:
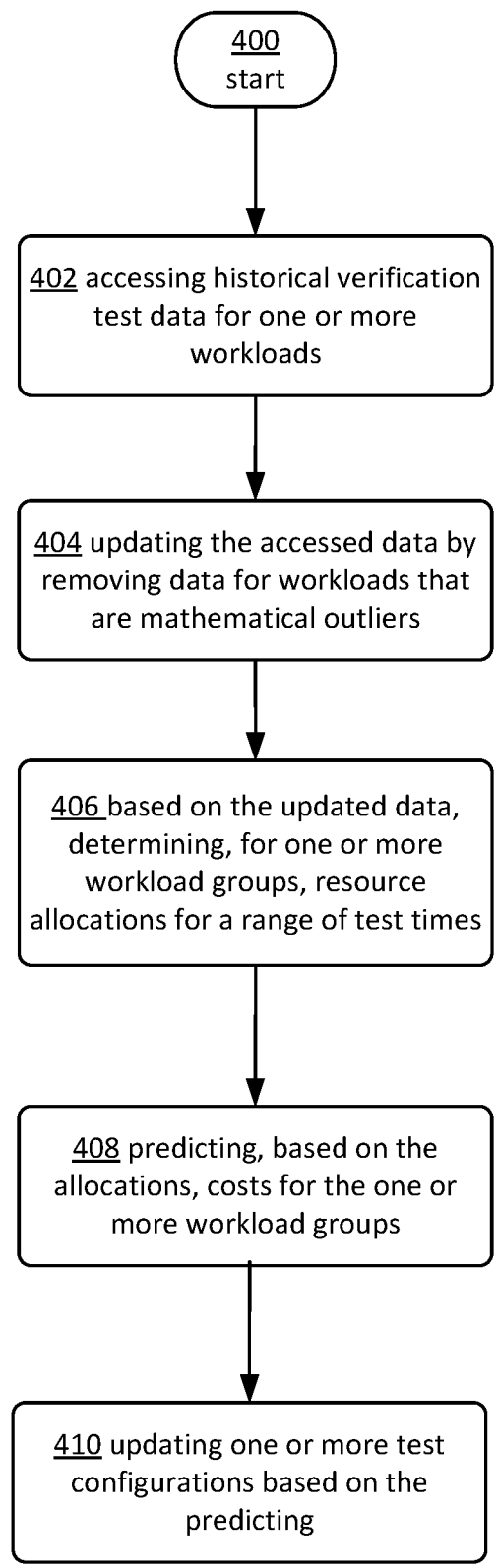
FIG. 4 is a flowchart depicting an example procedure for allocating resources in accordance with the present disclosure.

Turning now to FIG. 4, illustrated is an example operational procedure for allocating computing resources in accordance with the present disclosure. In an embodiment, example operational procedure may implement a method for executing on one or more computing devices. Referring to FIG. 4, operation 401 illustrates accessing historical verification test data for one or more workloads.

Operation 401 may be followed by operation 403. Operation 403 illustrates updating the accessed data by removing data for workloads that are mathematical outliers.

Operation 403 may be followed by operation 405. Operation 405 illustrates based on the updated data, determining, for one or more workload groups, resource allocations for a range of test times.

Operation 405 may be followed by operation 407. Operation 407 illustrates predicting, based on the allocations, costs for the one or more workload groups. Operation 409 illustrates updating one or more test configurations based on the predicting.

In an embodiment, the historical verification test data comprises runtime test data for a predetermined time period.

In an embodiment, the procedure includes grouping tasks associated with the workloads based on one or more constraints.

In an embodiment, removing mathematical outliers comprises removing a top and bottom quartile.

In an embodiment, the procedure includes removing predictions that negatively impact cost without improving runtime or negatively impact runtime without improving cost.

In an embodiment, costs comprise costs with both current and optimized resource allocations.

In an embodiment, costs are based on resource preparation cost and work duration.

In an embodiment, the procedure includes generating a report of predicted time deltas and cost deltas.

In an embodiment, the procedure includes generating alerts when predicted resource consumption or runtime exceed predetermined limits.

In an embodiment, the updating comprises restriping computing resources.

Figure 5:
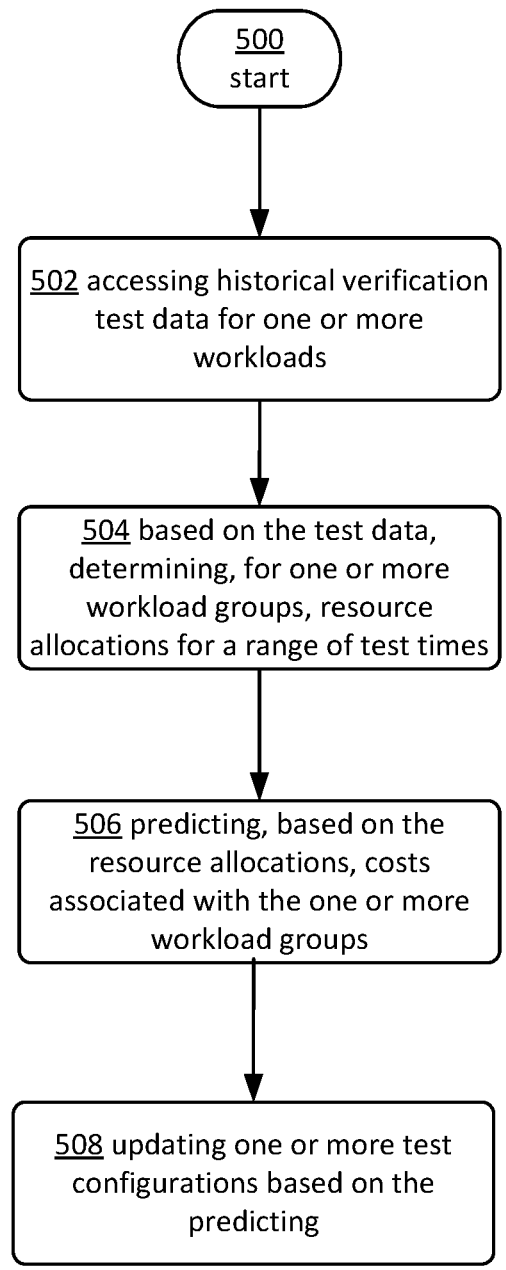
FIG. 5 is a flowchart depicting an example procedure for allocating resources in accordance with the present disclosure.

Turning now to FIG. 5, illustrated is an example operational procedure for allocating computing resources in accordance with the present disclosure. Referring to FIG. 5, operation 501 illustrates accessing historical verification test data for one or more workloads.

Operation 501 may be followed by operation 503. Operation 503 illustrates based on the test data, determining, for one or more workload groups, resource allocations for a range of test times.

Operation 503 may be followed by operation 505. Operation 505 illustrates predicting, based on the resource allocations, costs associated with the one or more workload groups.

Operation 505 may be followed by operation 507. Operation 507 illustrates updating one or more test configurations based on the predicting.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider.

Figure 6:
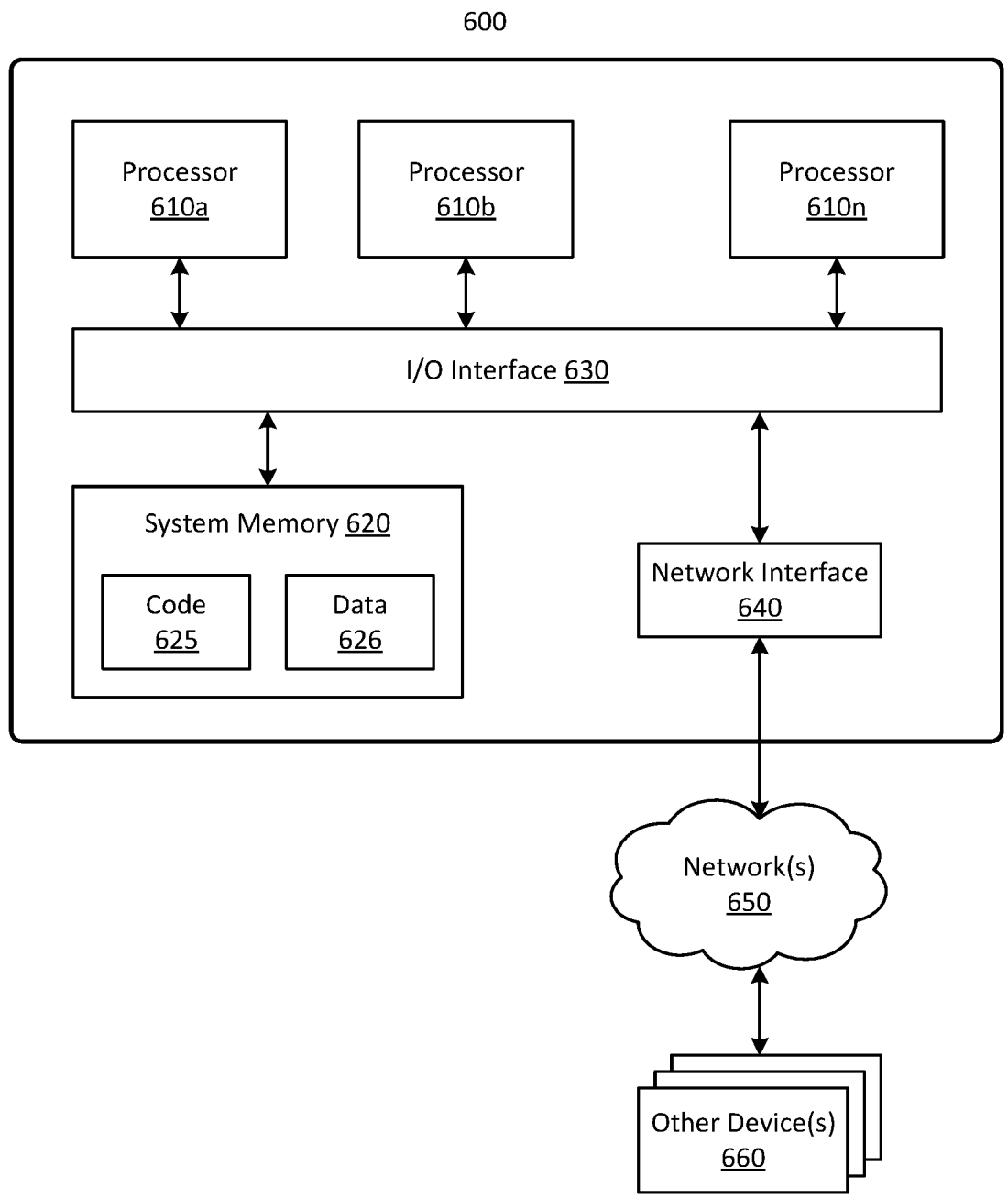
FIG. 6 is an example computing device in accordance with the present disclosure.

In some embodiments, a server that implements a portion or all of one or more of the technologies described herein, including the techniques to implement the allocation of virtual machines may include a general-purpose computer system that includes or is configured to access one or more computer-accessible media. FIG. 6 illustrates such a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x66, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data descry+bed above, are shown stored within system memory 620 as code 625 and data 626.

In one embodiment, I/O interface 630 may be configured to coordinate I/O traffic between the processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 650, such as other computer systems or devices as illustrated in FIGS. 1 through 4, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for allocating computing resources for workloads having different requirements, the method comprising:
   accessing historical verification test data for the workloads;
   grouping, by a computing device, tasks based on analysis of the workloads based on the requirements;
   updating the accessed data by removing data for workloads that are mathematical outliers, wherein the mathematical outliers are those in a top and bottom quartile;
   based on the updated data, determining, for one or more workload groups, resource allocations for a range of test times, wherein the determining comprises for predetermined time intervals in a range from minimum to maximum, determining an amount of resources to be allocated to each of the workload groups;
   discarding changes that negatively impact cost without improving runtime or changes that negatively impact runtime without improving cost;
   predicting, based on the resource allocations and historical data, costs for the one or more workload groups, the costs indicative of how much each workload group will cost for current and optimized resource allocations, the costs including resource preparation cost and actual work duration; and
   allocating computing resources in a computing environment based on the predicting.

2. The method of claim 1, wherein the historical verification test data comprises runtime test data for a predetermined time period.

3. The method of claim 1, further comprising removing predictions that negatively impact cost without improving runtime or negatively impact runtime without improving cost.

4. The method of claim 1, further comprising generating a report of predicted time deltas and cost deltas.

5. The method of claim 1, further comprising generating alerts when predicted resource consumption or runtime exceed predetermined limits.

6. The method of claim 1, wherein the updating comprises restriping computing resources.

7. A system, comprising:
   one or more processors; and
   a memory in communication with the one or more processors, the memory having computer-readable instructions stored thereupon that, when executed by the one or more processors, cause the system to perform operations comprising:
   accessing historical verification test data for one or more workloads having different requirements;
   grouping tasks based on analysis of the workloads based on the requirements;
   updating the accessed data by removing data for workloads that are mathematical outliers, wherein the mathematical outliers are those in a top and bottom quartile;

based on the test data, determining, for one or more workload groups, resource allocations for a range of test times, wherein an amount of resources is allocated to each of the workload groups from a minimum predetermined time interval to a maximum predetermined time interval;

discarding changes that negatively impact cost without improving runtime or changes that negatively impact runtime without improving cost;

predicting, based on the resource allocations and historical data, costs associated with the one or more workload groups, the costs indicative of how much each workload group will cost for current and optimized resource allocations, the costs including resource preparation cost and actual work duration; and allocating computing resources in a computing environment based on the predicting.

8. The system of claim 7, wherein the historical verification test data comprises runtime test data for a predetermined time period.

9. The system of claim 7, further comprising removing predictions that negatively impact cost without improving runtime or negatively impact runtime without improving cost.

10. The system of claim 7, further comprising generating a report of predicted time deltas and cost deltas.

11. A computer-readable storage medium having computer-executable instructions stored thereupon which, when executed by one or more processors of a computing device, cause the computing device to:

access historical verification test data for one or more workloads having different requirements;

group tasks based on analysis of the workloads based on the requirements;

update the accessed data by removing data for workloads that are mathematical outliers, wherein the mathematical outliers are those in a top and bottom quartile;

based on the updated data, determine, for one or more workload groups, resource allocations for a range of test times, wherein an amount of resources is allocated to each of the workload groups for predetermined time intervals in a range from minimum to maximum;

discarding changes that negatively impact cost without improving runtime or changes that negatively impact runtime without improving cost;

predict, based on the allocations and historical data, costs for the one or more workload groups, the costs indicative of how much each workload group will cost for current and optimized resource allocations, the costs including resource preparation cost and actual work duration; and allocate computing resources in a computing environment based on the predicting.

12. The computer-readable storage medium of claim 11, further comprising computer-executable instructions stored thereupon which, when executed by the one or more processors of the computing device, cause the computing device to generate alerts when predicted resource consumption or runtime exceed predetermined limits.

* * * * *